D. S. WAGENER.
Grain Cleaner.
No. 930. Reissued March 13, 1860.
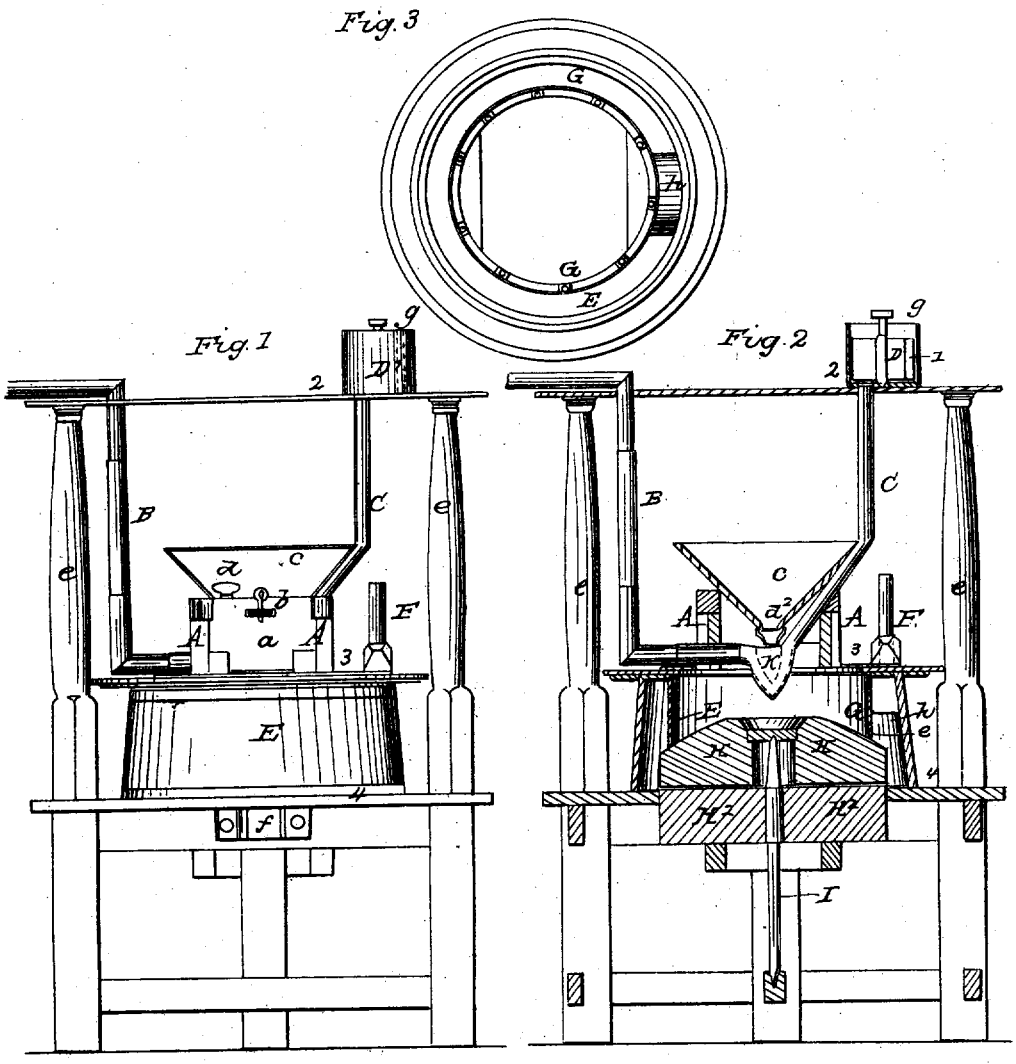
N. PETERS. Photo-Lithographer. Washington, D. C.

UNITED STATES PATENT OFFICE.

D. S. WAGENER, OF PENN YAN, NEW YORK.

IMPROVEMENT IN FLOURING-MILLS.

Specification forming part of Letters Patent No. 13,610, dated September 25, 1855; Reissue No. 930, dated March 13, 1860.

*To all whom it may concern:*

Be it known that I, D. S. WAGENER, of Penn Yan, in Yates county, in the State of New York, have invented certain new and useful Improvements in Flouring-Mills; and I do hereby declare that the following is a full and exact description thereof, reference being had to the accompanying drawings, and to the letters of reference marked thereon.

Figure 1 is a front elevation. Fig. 2 is a vertical section. Fig. 3 is an inverted section of the case or air-chamber.

In the construction of my machine, Fig. 1, letter A is the air-tight chamber, resting on the casement surrounding the stones or runner; *a*, the door opening into the chamber, when necessary to examine the interior of the same; *b*, pin and staple for fastening the door; B, the ventilating-tube, extending from the outside of the building into the air-tight chamber; C, the suction-tube, connecting with tube B in the air-tight chamber, and running beneath the shoe and above the eye of the millstone to the fanners D; *g*, the driving-pulley; E, the case inclosing the runner or stones, which I convert into a hot-air chamber or extra receiver, in which the heated air accumulates; F, the tube for carrying off the hot air; 1, the throat in fanner D, (shown in dotted lines;) 2, 3, and 4, the floors.

In Fig. 2, A is the air-tight chamber; *c*, the hopper; $d^2$, the shoe; *e e*, the posts of the frame; B, the ventilating-tube; C, the suction-tube; D, the fanners; 1, the throat; *g*, the driving-pulley. 2, 3, and 4 represent different floors of the building; E, the hot-air chamber; G, the partition for excluding the hot air from the air-tight chamber A; F, the tube for carrying off the heated air; *h*, the throat or scroll for receiving the air; H, the runner; $H^2$, the bed-stone; I, the spindle and bearings; K, that portion of the tube where tubes B and C connect. At this part of the tube there is an aperture directly under the shoe, into which the grain falls, and is something like a funnel. The opening below is just large enough to let the grain fall through that portion of the tube where the current passes, and which is shown in dotted lines at K, only as fast as it can be ground, thus having the full force of the current on the grain and clearing it of all impurities.

In Fig. 3, G is the inner partition; E, the hot-air case; *h*, the throat for arresting the hot air and causing it to enter tube F. In the operation of my machine I construct chamber A air-tight, except where the grain passes from the hopper. By this means I exclude all dust from the eye of the stone. I then introduce into chamber A tube B from the outside of the building, or a clean apartment belonging thereto, connecting it in chamber A with tube C and fanner D, or its equivalent. I then put my blower in motion by any ordinary connection, and as the blower is made rapidly to revolve a suction is created through tubes B and C, passing rapidly through the grain as it falls through the tube into the eye of the stone; or I may disconnect the tube B and dispense with it entirely, and allow the air to be drawn up through the grain at the point of discharge-tube C shown at K, thus cleaning grain at the point designated by suction-blast alone, the air-tight chamber excluding all dust from concentrating in the eye of the stone, as in the mills in ordinary grinding. The entire force of the current thus introduced passes undisturbed through the grain, cleaning it entirely of the dust and all light substances which may have remained in the wheat after the cleaning process usual is undergone, or which may have collected while in the mill. A portion of the air thus introduced into the air-tight chamber A can escape with the grain and ventilate the stones. As the constant friction of the stone causes heat, it is necessary for me to provide for carrying it off, or else it would rise up and condense in my air-tight chamber, and cause the inside of the chamber to sweat and become moist, and if allowed to do so would pass down through the eye of the stone and greatly retard the grinding process by causing a dampness in the grain and flour, and thereby heating it and greatly injuring the same. To avoid this, I construct an extra chamber or casing, E. This chamber surrounds the entire bed of the stone, and is formed by means of the extra partition G, which is made stationary on the under side of the top of the casing, and extending down to the back of the stone, thereby excluding the hot air from the air-tight chamber. As the stone revolves, the centrifugal force of the stone imparts a circular current to the air and causes it to tend outward and around with the stone until it comes to the throat *h*, where it is checked and passes up through the tube F, and is mingled with the outer air, leaving the flour or meal cool and in a good condition for bolting, free from all dust and the offensive smell which injures the quality and sale of the flour, and which is caused by the confinement of the heated air in the case around the stone, causing the meal to ferment and become sour that remains in it. This I avoid by my invention.

Having thus fully described the construction and operation of my invention, what I claim, and desire to secure by Letters Patent, is—

1. The arrangement of tubes B and C, connected by the supplemental shoe K within the air-tight chamber A, in the manner described, and for the purposes specified.

2. I do not claim the suction blast or draft as new, but what I do claim is cleaning grain through a tube or case at the point K by means of tube or case C and K and blast-fan D, or their equivalent, as set forth.

D. S. WAGENER.

Witnesses:
T. G. CLAYTON,
CHAS. B. BURCH.